July 17, 1956
E. PRINTZ, SR., ET AL
2,754,737
MEANS FOR COUPLING ALTERNATIVELY EMPLOYED
SOIL CULTIVATING IMPLEMENTS OR THE
LIKE TO A TRACTOR OR THE LIKE
Filed Oct. 27, 1950
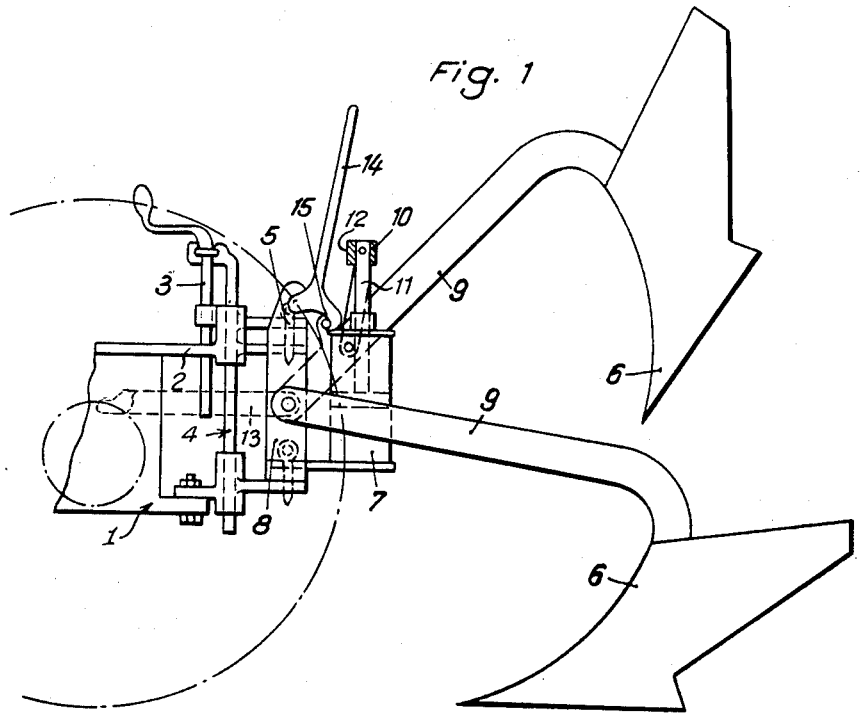
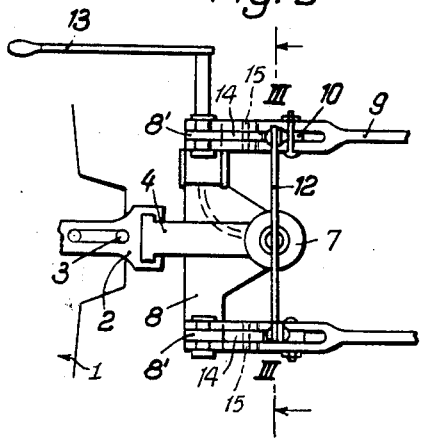
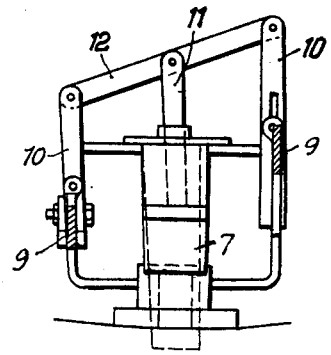
Inventor:
ERNST PRINTZ SEN
ERNST PRINTZ JR.
By C.I.Freeman
ATTORNEY.

United States Patent Office 2,754,737
Patented July 17, 1956

2,754,737

MEANS FOR COUPLING ALTERNATIVELY EMPLOYED SOIL CULTIVATING IMPLEMENTS OR THE LIKE TO A TRACTOR OR THE LIKE

Ernst Printz, Sr., and Ernst Printz, Jr., Kettwig (Ruhr), Germany

Application October 27, 1950, Serial No. 192,554

Claims priority, application Germany October 29, 1949

2 Claims. (Cl. 97—29)

The invention relates to a mechanism for coupling soil cultivating implements or the like to a tractor or the like.

It is known how to attach soil cultivating implements directly to a tractor or to a frame which is attached to the tractor so as to be operable for being lifted and lowered, and to employ for lifting and lowering the implements a control device actuated by compressed air or by pressure liquid. If the soil cultivating implements are attached directly to the tractor, they must be specially designed for this purpose, as a result of which the implements often no longer fully serve their proper function. The fixed connection between implements and tractor, in particular, prevents the latter's use for other purposes, for instance as an independent hauling device. If, on the other hand, the soil cultivating implements are arranged on a frame carried or pulled by the tractor, long transmission rods from the hydraulic lifting cylinders of the tractor to the implements are required. Moreover, it is difficult, and often impossible, in view of the constructional differences in tractors, to adjust the transmission rods to the different kinds of soil cultivating implements.

This is where the invention comes in, by proposing, for attaching soil cultivating implements, or agricultural machines, to a traction engine, in particular a tractor, to employ a coupling device provided directly with a pressure cylinder operated by oil or compressed air, which presses the tillage implements during operation into the soil and thereafter lifts them into a rest position. By placing the pressure and control cylinder directly in the coupling device the connections hitherto employed between the tractor and the frame carrying the implements become superfluous and these connections can be designed independently of the type of tractor. Moreover, the most varied operating implements, with suitable, uniformly shaped terminals, can be connected directly to the implement carrier of the coupling. As the different operating implements often have different working depths, it is advisable to arrange the coupling device so as to be adjustable in height relatively to the tractor, whereafter the depth of penetration of the implements can be regulated at will independently of the stroke of the cylinder piston.

The pressure liquid is supplied to the lifting cylinder according to the invention by a pump situated in or on the tractor, which pump may, for instance, be driven by a shaft of the tractor.

Further details of the coupling device according to the invention are described in the drawing, which illustrates a form of construction by way of example, Fig. 1 shows in side elevation a coupling device for attaching two-way ploughs to a tractor, Fig. 2 is a plan view of Fig. 1, and Fig. 3 is a sectional view taken on the line III—III of Fig. 2.

Referring to the drawing, at the rear frame 1 of a a tractor there is connected, a guide 2 for a carriage 4, and the carriage 4 can be regulated in height by an adjusting spindle 3. To this carriage, in the example illustrated in the drawing, the coupling gear according to the invention is connected by means of two bolts 5. The coupling gear consists of a frame 8, a hydraulic cylinder 7 and lateral connections 8' for the swingable arms 9 of the ploughshares 6.

For lifting and lowering the ploughshares 6 which are attached to the coupling gear, the arms 9 of the shares are connected each to one end of a link 10 the other ends of which engage a lever 12 which extends from the piston rod 11 of the lifting cylinder 7. For controlling the lifting cylinder 7 there is provided a control lever 13, manipulated from the driver's seat of the tractor by which the pressure liquid delivered by a pump (not shown) on the tractor may be delivered to the front or the rear of the piston of the lifting cylinder 7. The implement connected to the coupling device can therefore be pressed into the soil or raised from it. Then the requirement demanded of two-way ploughs, to keep one share lifted while the other remains in operative position, can be met in a simple manner by fixing the lifted share to the frame 8 by means of a locking lever 14, which engages a lug 15 of the arm 9. The immobilizing of the lifted share also has the advantage that the movement of the other share by means of the lever 12 is effected at double the piston velocity of the lifting cylinder 7.

The locking device 14, 15, is preferably constructed in such a manner that it engages automatically when the ploughshare is raised. When turning at the end of a field, the second ploughshare is also fixed to the frame 8 and the first share is disengaged and brought into its operative position for ploughing the next furrow. The depth adjustment of the ploughshares for heavy or light soil can be effected independently of the operation of the cylinder 7 by suitable adjustment of the carriage 4 by means of the spindle 3.

The coupling device which forms the subject of this invention, which is characterised mainly by the direct connection to it of a hydraulic cylinder and connections for the soil cultivating implements or agricultural machines, and its removable coupling with the rear part of the traction engine or the tractor, is not limited to the form of construction described by way of example.

In the form of construction illustrated by way of example in the drawing, a piston actuated hydraulically or by compressed air, which is directly connected to the coupling, serves to press the tillage implements into the soil and lift them into their rest position. Without departing from the idea which underlies the invention, this cylinder may be replaced by a mechanically or electrically operated pressure and lifting device.

We claim:

1. In a device, for use in removably coupling two-way plow shares with their arms movable in vertical planes with relation to a tractor structure, in combination, a frame removably connected to said tractor structure comprising means for vertical adjustment of a section of said frame, hydraulic means including a vertically reciprocable piston supported on said section, said arms of said plow shares being pivoted to said section for vertical plow share movement, means connected to said section and operable for latching each plow share in a raised position for immobilization thereof independently of the other, and a mechanism for transmitting the piston movements to the arms of said plow shares for raising and respectively lowering the same including a two-armed lever tiltably connected mid-way between its ends to said piston and disposed between said arms of said plow shares and having each end in driving connection with a plow share arm, whereby said plow shares may be raised and lowered by said piston in tied movement at a first speed range when both are unlatched and respectively each plow share arm may be raised and lowered by said piston at a second speed range double that of said first speed range when the other arm is latched.

2. In a coupling device, as claimed in claim 1, together with a link pivoted between each plow share arm and an opposite end of said two-armed lever for individual plow share arm movement.

References Cited in the file of this patent

UNITED STATES PATENTS

| | | |
|---|---|---|
| 217,506 | Benson | July 15, 1879 |
| 838,796 | Milton | Dec. 18, 1906 |
| 988,813 | Procknow | Apr. 4, 1911 |
| 1,013,740 | Chandonnet | Jan. 2, 1912 |
| 1,262,304 | Carpenter | Apr. 9, 1918 |
| 1,808,759 | Bickerton | June 9, 1931 |
| 1,864,639 | Crezee | June 28, 1932 |
| 2,169,917 | Keeler | Aug. 15, 1939 |
| 2,198,196 | Goldup | Apr. 23, 1940 |
| 2,424,459 | Hettelsater | July 22, 1947 |
| 2,457,163 | Lansing | Dec. 28, 1948 |
| 2,464,615 | Sawall | Mar. 15, 1949 |
| 2,512,733 | Anderson | June 27, 1950 |
| 2,521,503 | Clark | Sept. 5, 1950 |

FOREIGN PATENTS

| | | |
|---|---|---|
| 601 | Great Britain | of 1870 |
| 524,515 | France | May 14, 1921 |
| 223,726 | Switzerland | Jan. 4, 1943 |